(12) United States Patent
Huang et al.

(10) Patent No.: US 11,865,769 B2
(45) Date of Patent: Jan. 9, 2024

(54) WEAK MATERIAL PHASES

(71) Applicant: Hewlett-Packard Development Company, L.P., Spring, TX (US)

(72) Inventors: Wei Huang, Palo Alto, CA (US); Jun Zeng, Los Gatos, CA (US)

(73) Assignee: HEWLETT-PACKARD DEVELOPMENT COMPANY, L.P., Spring, TX (US)

(*) Notice: Subject to any disclaimer, the term of this patent is extended or adjusted under 35 U.S.C. 154(b) by 12 days.

(21) Appl. No.: 17/544,541

(22) Filed: Dec. 7, 2021

(65) Prior Publication Data

US 2023/0173746 A1    Jun. 8, 2023

(51) Int. Cl.
*B33Y 10/00*      (2015.01)
*B29C 64/141*    (2017.01)
*B33Y 80/00*      (2015.01)

(52) U.S. Cl.
CPC ............ *B29C 64/141* (2017.08); *B33Y 10/00* (2014.12); *B33Y 80/00* (2014.12)

(58) Field of Classification Search
None
See application file for complete search history.

(56) References Cited

U.S. PATENT DOCUMENTS

| | | | |
|---|---|---|---|
| 9,327,451 B2 | 5/2016 | Teulet | |
| 2014/0010908 A1 | 1/2014 | Matsumoto et al. | |
| 2017/0120535 A1 | 5/2017 | Maccurdy et al. | |
| 2020/0114422 A1* | 4/2020 | Mark | B29C 64/40 |
| 2020/0247004 A1* | 8/2020 | Oshima | B33Y 50/02 |
| 2022/0388064 A1* | 12/2022 | Stöhr | B33Y 80/00 |

* cited by examiner

*Primary Examiner* — Mohammad M Ameen
(74) *Attorney, Agent, or Firm* — SHOOK, HARDY & BACON L.L.P.

(57) ABSTRACT

Examples of methods are described. In some examples, a method may include printing a first solid material phase region. In some examples, the method may include printing a second solid material phase region distanced from the first solid material phase region. In some examples, the method may include printing a plurality of distanced beams, each having a thickness that is not more than one millimeter, to form a weak material phase region between the first solid material phase region and the second solid material phase region. In some examples, the weak material phase region has a volumetric density less than one.

10 Claims, 6 Drawing Sheets

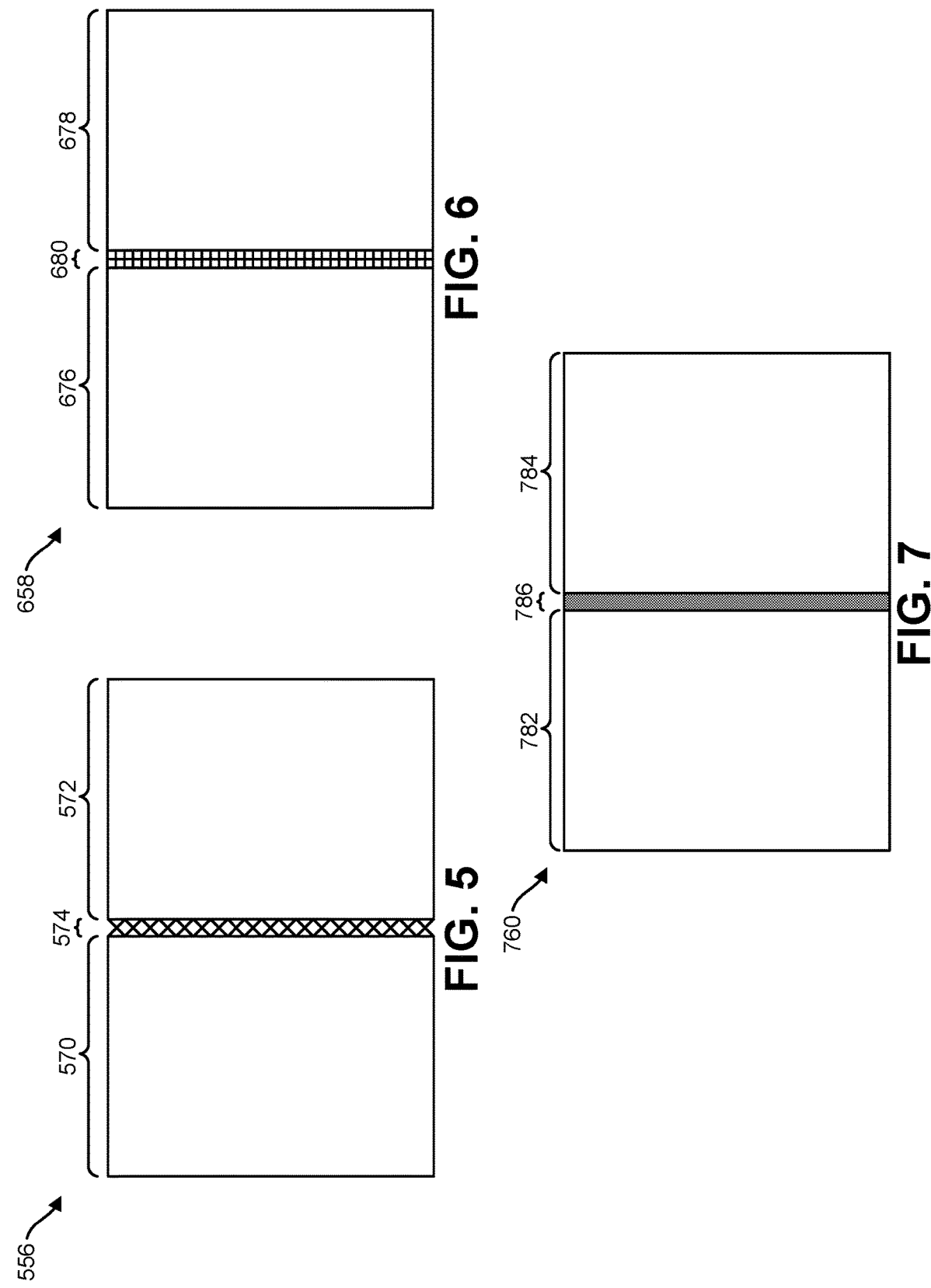

WEAK MATERIAL PHASES

BACKGROUND

Three-dimensional (3D) objects may be produced from a digital model using additive manufacturing. Additive manufacturing may be used in rapid prototyping, mold generation, mold master generation, and short-run manufacturing. Additive manufacturing involves the application of successive layers of build material. In some additive manufacturing techniques, the build material may be cured or fused.

BRIEF DESCRIPTION OF THE DRAWINGS

FIG. 5 is a diagram illustrating an example of an object in accordance with some of the techniques described herein;

FIG. 6 is a diagram illustrating an example of an object in accordance with some of the techniques described herein;

FIG. 7 is a diagram illustrating an example of an object in accordance with some of the techniques described herein;

DETAILED DESCRIPTION

Figure 1:
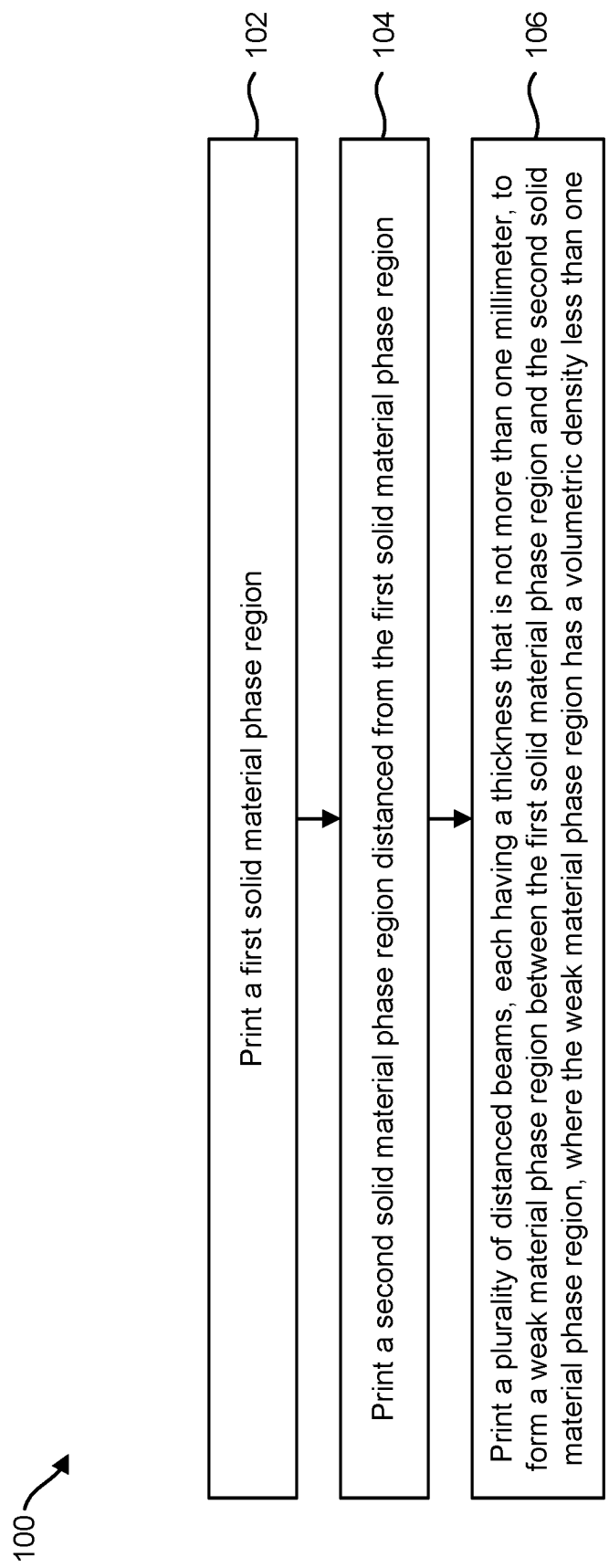
FIG. 1 is a flow diagram illustrating an example of a method for producing a weak material phase.

Additive manufacturing may be used to manufacture three-dimensional (3D) objects. 3D printing is an example of additive manufacturing. Some examples of 3D printing may selectively deposit an agent or agents (e.g., droplets) at a pixel level to enable control over voxel-level energy deposition. For instance, thermal energy may be projected over material in a build area, where a phase change (for example, melting and solidification) in the material may occur depending on the voxels where the agents are deposited.

It may be difficult to manufacture functionally graded objects using homogeneous material. For instance, it may be difficult to manufacture an object with a graded Young's modulus with a homogeneous material. The capability to manufacture objects with varying mechanical properties using a homogeneous material may enhance object designs and/or reduce manufacturing costs (e.g., manufacturing complexity, heterogeneous material handling, etc.).

In some examples of 3D manufacturing (e.g., Multi Jet Fusion) that use a single powder material, end-part functional properties (e.g., mechanical properties) may vary due to the thermal history experienced by each voxel. For instance, different cooling may result in different crystalline contents in different voxels. In some examples, a disparity of the thermal history at neighboring voxels may result in functionally graded materials. For example, the degree of fusion in Multi Jet Fusion may affect the resulting material properties (e.g., fracture toughness, Young's modulus, strain tolerance, and/or stress tolerance, etc.). For instance, fully fused polymer powder and partially fused polymer powder may exhibit different properties. Different degrees of fusing may be utilized to provide target mechanical properties.

Some examples of the techniques described herein may provide weak material phases by embedding fine solid features. A weak material phase is a material property that is weaker than a solid material phase. A solid material phase region of an object is a region of the object to be manufactured as a solid (e.g., without pores, without hollow portions, with approximately homogeneous solidity, with approximately uniform makeup, etc.). A weak material phase region of an object is a region of the object to be manufactured with a weaker mechanical property than a solid material phase region. For instance, fine solid features (e.g., beams) may be embedded between solid materials of an object to form porous regions with weaker mechanical properties than a solid material phase region. When the features are fine enough (e.g., 1 millimeter or less in thickness for each beam) and the quantity of features is large enough (e.g., when the features occupy more than 10% of a gap, when the features are of a threshold density, etc.), a weak material phase region may be homogenized into a solid material with different material properties from those of the solid material phase region. Accordingly, a weak material phase region may be manufactured based on geometrical manipulation of an object with the same base powder and/or the same manufacturing procedure (e.g., 3D printing procedure).

A 3D object may be represented as data (e.g., a 3D model). In some examples, an apparatus may receive a file or files of data and/or may generate a file or files of data. In some examples, the apparatus may generate data with model(s) created on the apparatus from an input or inputs (e.g., scanned object input, user-specified input, etc.). For instance, a 3D object may be represented by data (e.g., a file) that indicates the shape and/or features of a 3D object. For instance, a 3D object may be represented as geometrical data, coordinate points, a mesh, a point cloud, and/or voxels.

A voxel is a representation of a location in a 3D space. For example, a voxel may represent a volume or component of a 3D space. For instance, a voxel may represent a volume that is a subset of the 3D space. In some examples, voxels may be arranged on a 3D grid. For instance, a voxel may be rectangular or cubic in shape. In some examples, voxels may be arranged along axes. An example of three-dimensional (3D) axes includes an x dimension, a y dimension, and a z dimension. In some examples, a quantity in the x dimension may be referred to as a width, a quantity in the y dimension may be referred to as a length, and/or a quantity in the z dimension may be referred to as a height. The x and/or y axes may be referred to as horizontal axes, and the z axis may be referred to as a vertical axis. Other orientations of the 3D axes may be utilized in some examples, and/or other definitions of 3D axes may be utilized in some examples.

Examples of a voxel size dimension may include 25.4 millimeters (mm)/150≈170 microns for 150 dots per inch (dpi), 490 microns for 50 dpi, 2 mm, etc. The term "voxel level" and variations thereof may refer to a resolution, scale, or density corresponding to voxel size. In some examples, the term "voxel" and variations thereof may refer to a "thermal voxel." In some examples, the size of a thermal voxel may be defined as a minimum that is thermally meaningful (e.g., greater than or equal to 42 microns or 600 dots per inch (dpi)). A set of voxels may be utilized to represent a build volume.

A build volume is a volume in which an object or objects may be manufactured. A "build" may refer to an instance of 3D manufacturing. A layer is a portion of a build volume. For example, a layer may be a cross section (e.g., two-dimensional (2D) cross section) or 3D portion (e.g., rectangular prism) of a build volume. In some examples, a layer may refer to a horizontal portion (e.g., plane) of a build volume. In some examples, an "object" may refer to an area and/or volume in a layer and/or build volume indicated for forming a physical object.

Some examples of 3D objects may include lattice structures. A lattice structure is an arrangement of a member or members (e.g., spars). For example, a lattice structure may be structured along one dimension, two dimensions, and/or three dimensions. Examples of a lattice structure may include spars, two-dimensional grids, three-dimensional grids, etc. In some examples, a lattice structure includes members disposed in a crosswise manner. For instance, two members of a lattice structure may intersect at a diagonal, perpendicular, or oblique (e.g., non-perpendicular and non-parallel) angle. A lattice structure may be represented by data, a geometry(ies), model(s), etc. For instance, a lattice structure may be represented by a geometrical mesh model, point cloud, voxels, 3D manufacturing format (3MF) file, an object (OBJ) file, computer aided design (CAD) file, and/or a stereolithography (STL) file, etc. Some examples of the geometries and/or structures (e.g., lattice structures, etc.) described herein may be manufactured by additive manufacturing.

In some examples of 3D manufacturing (e.g., Multi Jet Fusion), each voxel in the build volume may undergo a thermal procedure (e.g., approximately 15 hours of build time (e.g., time for layer-by-layer printing) and approximately 35 hours of additional cooling). The thermal procedure of voxels that include an object may affect the manufacturing quality (e.g., functional quality) of the object.

In some examples, "powder" may indicate or correspond to particles. In some examples, an object may indicate or correspond to a location (e.g., area, volume, etc.) where particles are to be sintered, melted, and/or solidified. For example, an object may be formed from sintered or melted powder.

While plastics (e.g., polymers) may be utilized as a way to illustrate some of the approaches described herein, some the techniques described herein may be utilized in various examples of manufacturing. For instance, some examples may be utilized for plastics, polymers, semi-crystalline materials, metals, etc. Some additive manufacturing techniques may be powder-based and driven by powder fusion. Some examples of the approaches described herein may be performed with area-based powder bed fusion-based additive manufacturing. Some examples of the techniques described herein may be performed with Stereolithography (SLA), Multi Jet Fusion (MJF), Selective Laser Sintering (SLS), Digital Light Processing (DLP), Fused Deposition Modeling (FDM), Selective Laser Melting (SLM), etc. Some examples of the approaches described herein may be applied to additive manufacturing where agents carried by droplets are utilized for voxel-level thermal modulation.

Throughout the drawings, similar reference numbers may designate similar or identical elements. When an element is referred to without a reference number, this may refer to the element generally, without limitation to any particular drawing or figure. In some examples, the drawings are not to scale and/or the size of some parts may be exaggerated to more clearly illustrate the example shown. Moreover, the drawings provide examples in accordance with the description. However, the description is not limited to the examples provided in the drawings.

FIG. 1 is a flow diagram illustrating an example of a method 100 for producing a weak material phase. The method 100 and/or an element or elements of the method 100 may be performed by an electronic device. For example, the method 100 may be performed by the apparatus 324 described in relation to FIG. 3.

The apparatus may print 102 a first solid material phase region. In some examples, printing may include controlling a printing device (e.g., printhead(s), printhead carriage(s), fusing lamp(s), laser(s), etc.) and/or sending printing instructions to another device (e.g., a 3D printer) indicating the first solid material phase region. For instance, the apparatus may be a 3D printer and may extrude a substance (e.g., fusing agent, binding agent, etc.) and/or may project energy (e.g., light, heat, laser(s), etc.) in a region of a build volume for solidification (e.g., an object region targeted for the first solid material phase region). In some examples, the apparatus may apply fusing agent on a layer of powder in an object region and project energy on the layer to fuse powder in the object region.

In some examples, printing may include sending printing instructions to another device (e.g., 3D printer). For instance, the apparatus may be an electronic device (e.g., computer) in communication with the other device. The apparatus may send the printing instructions to the other device. The printing instructions may indicate an object region for solidification. The other device (e.g., 3D printer) may utilize (e.g., read and/or execute) the printing instructions to solidify material (e.g., powder) in the object region. The first solid material phase region may be a region targeted for complete solidification (e.g., fusion). For instance, the first solid material phase region may have a volumetric density of one. As used herein, the term "volumetric density" means a ratio of object region volume to total volume of a region (e.g., volume of a bounding region). For instance, a volumetric density of one may indicate that the region targeted for printing may completely occupy a bounding region (e.g., the solid material phase region may be solid and/or non-porous throughout).

The apparatus may print 104 a second solid material phase region distanced from the first solid material phase region. For instance, the apparatus may control a printing device (e.g., printhead(s), printhead carriage(s), fusing lamp(s), laser(s), etc.) and/or send printing instructions to another device (e.g., a 3D printer) indicating the second solid material phase region. The second solid material phase region may be a region targeted for complete solidification (e.g., fusion). For instance, the second solid material phase region may have a volumetric density of one. The second solid material phase region may be distanced from the first solid material phase region. For instance, there may be a discontinuity and/or separation (e.g., gap) between the first solid material phase region and the second solid material phase region. In some examples, part or all of the first solid material phase region may be distanced from part or all of the second solid material phase region.

The apparatus may print 106 a plurality of distanced beams to form a weak material phase region between the first solid material phase region and the second solid material phase region. In some examples, each beam has a thickness that is not more than one millimeter (mm). In some examples, beam thickness may refer to a thinnest dimension of a beam and/or a dimension that is perpendicular to a connecting direction of a beam. The weak material phase region may have a volumetric density less than one. For instance, a bounding volume of the weak material phase region may not be completely occupied by solid material (e.g., beams). In some examples, the weak material phase region may include a gap(s), pore(s), space(s), etc. For instance, the weak material phase region may not be continuously solid (e.g., the weak material phase region may be discontinuously solid and/or partially solid).

A beam may be an elongated structure coupled to a region or regions (e.g., region(s) of an object). For instance, a beam(s) of the plurality of distanced beams may connect the first solid material phase region to the second solid material phase region. Examples of beams connecting a first solid material phase region and a second solid material phase region are given in relation to FIG. 2. In some examples, a beam may be cylindrical, elliptical, prismatic, rectangular, etc. In some examples, a beam may extend in a perpendicular direction or another angle from a region or regions of an object.

In some examples, beams may be distanced from each other. For instance, two beams or more beams may be partially or completely separated from each other. For example, two beams may be separated by 0.5 mm, 1 mm, 2 mm, 5 mm, 10 mm, 1 centimeter (cm), etc. In some examples, beams may run in parallel to each other or may be disposed at an oblique angle from each other. In some examples, beams may not include an intersecting structure and/or may not contact an intersecting structure (e.g., crosswise structure) between solid material phase regions. In some examples, beams are not included in a grid and/or lattice structure. For instance, a spar of a lattice structure may not be a beam in some examples. In some examples, the weak material phase region may include a lattice structure. In some examples, the weak material phase region may include beams and/or a lattice structure(s). Examples of lattice structures between solid material phase regions are given in relation to FIG. 5 and FIG. 6.

In some examples, a gap in the plurality of distanced beams may be filled with an unfused substance. For instance, the distance between beams may be partially or completely filled with an unfused substance. In some examples, the unfused substance may be unfused powder. For instance, the unfused substance may be manufacturing powder that is not printed for fusion. In some examples, the unfused substance may be a liquid, filling (e.g., adhesive, rubber, epoxy, etc.), or other substance. In some examples, the unfused substance may be disposed in the distance between beams during fusion and/or may be added after fusion.

In some examples, a weak material phase region may exhibit a different material property (e.g., mechanical property) than a solid material phase region(s). For instance, the weak material phase region may exhibit less material strength, less stress tolerance, and/or less strain tolerance than a solid material phase region(s). In some examples, the weak material phase region may have a material strength (e.g., target and/or threshold material strength) to connect solid material phase regions. In some examples, the weak material phase region may tend to break before a solid material phase region when the object is put under stress and/or strain.

In some examples, the weak material phase region may be homogenized into a solid material with a different material property than the first solid material phase region and the second solid material phase region. For instance, printing the plurality of beams may result in a solid or semi-solid weak material phase region with an approximately uniform material property that differs from a corresponding material property of a solid material phase region. An example of a homogenized weak material phase region is given in relation to FIG. 7.

In some examples, the weak material phase region is disposed in a first pattern in a first level of a leveled superstructure that includes the first solid material phase region and the second solid material phase region. In some examples, a second weak material phase region may be disposed in a second pattern in a second level of the leveled superstructure. The second pattern may be different from the first pattern. Utilizing different patterns on different levels may increase overall superstructure strength. An example of a leveled superstructure is given in relation to FIG. 8.

In some examples, the weak material phase region may be directed to a dead end. The dead end may be an end of the weak material phase region that abuts a solid material phase region. For instance, a weak material phase region may be disposed partially through an object and/or may not extend completely through an object (e.g., may not extend completely through a solid material phase region).

In some examples, the weak material phase region may be patterned in a rounded shape. For instance, the weak material phase region may be disposed along a curved line (e.g., along a line with a curve(s) and/or without sharply angled turns or edges). Utilizing a rounded shape of the weak material phase region may help to avoid sharp edges resulting from a break or fracture of the object along the weak material phase region. An example of a weak material phase region patterned in a rounded shape is given in relation to FIG. 9.

In some examples, the weak material phase region may be patterned in a retaining shape. For instance, the weak material phase region may be disposed along a shape to retain engagement between solid material phase regions in a case of a break or fracture along the weak material phase region. For instance, the weak material phase region may be disposed along an interlocking shape between solid material phase regions. An example of a weak material phase region patterned in a retaining shape is given in relation to FIG. 10.

In some examples, elements of the method 100 may be performed concurrently (e.g., in overlapping time frames, simultaneously, etc.) or may be performed in separate time frames (e.g., in a discrete sequence, in any order, etc.). For instance, the first solid material phase region, the second solid material phase region, and the weak material phase region may be printed concurrently or may be printed in a sequence. In some examples, the first solid material phase region, the second solid material phase region, and the weak material phase region may be printed in layers (e.g., layer-by-layer), where a layer may include a portion of the first solid material phase region, a portion of the second solid material phase region, and/or a portion of the weak material phase region (e.g., beam(s)).

In some examples, the method 100 may include an additional element(s) and/or operation(s). For instance, an element(s) and/or operation(s) described herein may be included in the method 100. In some examples, the method 100 may omit an element(s) and/or operation(s). For instance, an element(s) and/or operation(s) described herein may be omitted from the method 100.

Figure 2:
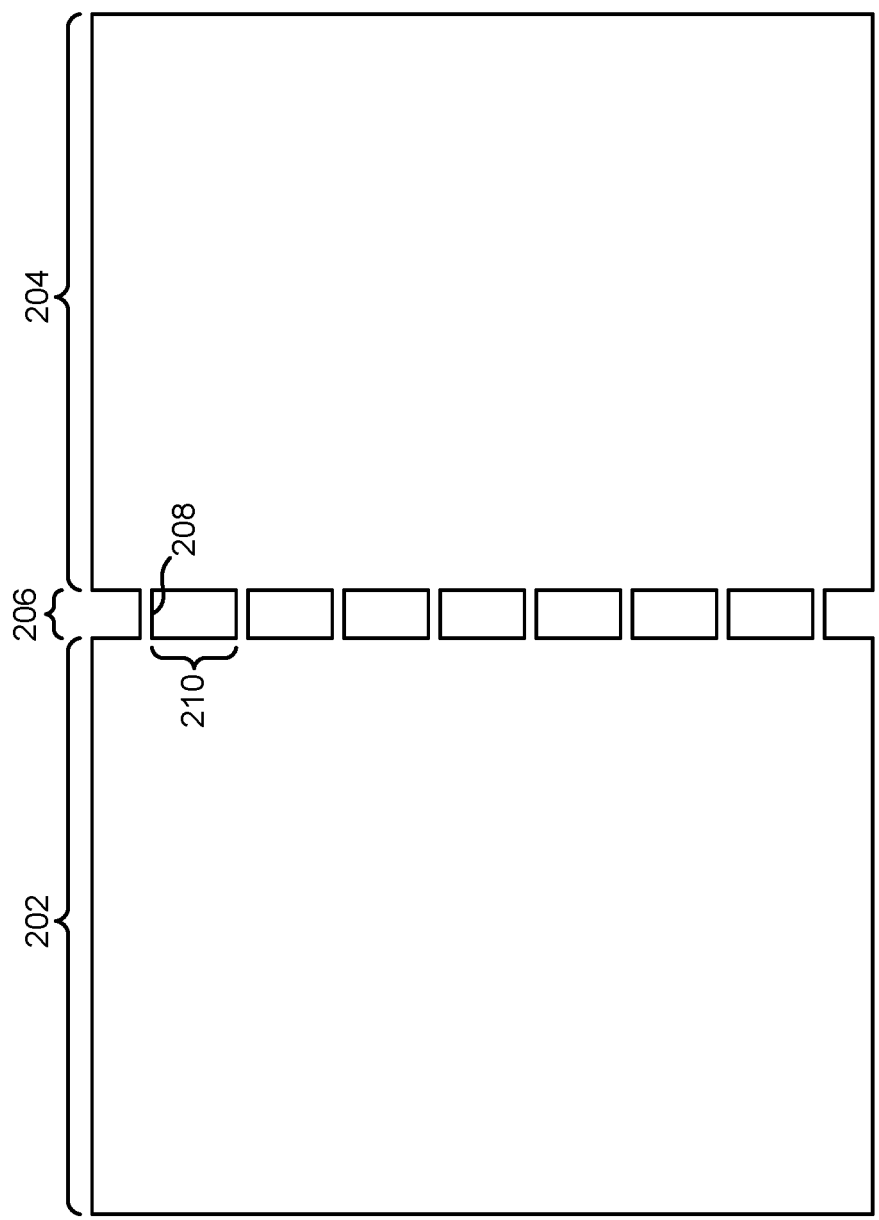
FIG. 2 is a diagram illustrating an example of an object in accordance with some of the techniques described herein.

FIG. 2 is a diagram illustrating an example of an object in accordance with some of the techniques described herein. In some examples, the object may be manufactured in accordance with the method 100 described in relation to FIG. 1.

The object may include a first solid material phase region 202 manufactured by 3D printing. The object may also include a second solid material phase region 204 manufactured by 3D printing. In the example of FIG. 2, the first solid material phase region 202 is rectangular and the second solid material phase region 204 are rectangular. In some examples, a first solid material phase region and/or a second solid material phase region may be curved, circular, triangular, irregularly shaped, etc.

The second solid material phase region 204 may be distanced from the first solid material phase region 202. As illustrated in FIG. 2, a gap exists between the first solid material phase region 202 and the second solid material phase region 204. In some examples, the distance between the first solid material phase region 202 and the second solid material phase region 204 may be 0.5 mm, 1 mm, 2 mm, 5 mm, 10 mm, 1 cm, 0.5 inches, 1 inch, etc. In some examples, the distance between solid material phase regions may vary along the gap. For instance, a portion of the gap may have a greater distance than another portion of the gap.

The object may include a weak material phase region 206. The weak material phase region 206 may have a volumetric density less than one. For instance, the weak material phase region 206 is not completely solid. The weak material phase region 206 may be disposed between the first solid material phase region 202 and the second solid material phase region 204. For instance, the weak material phase region 206 may be disposed within the distance (e.g., in the gap) between the first solid material phase region 202 and the second solid material phase region 204.

The weak material phase region 206 includes a plurality of distanced beams. Each of the beams may have a thickness that is less than or not more than one millimeter. For instance, a beam 208 may have a thickness of one millimeter or less. The beam 208 may be distanced 210 from another beam. For instance, the distance 210 between beams may be 0.5 mm, 1 mm, 2 mm, 5 mm, 10 mm, 1 cm, 0.5 inches, 1 inch, or another distance. In some examples, a gap in the plurality of distanced beams (e.g., a gap(s) between beams) may be filled with unfused manufacturing powder. In some examples, a gap between solid material phase regions (e.g., the first solid material phase region 202 and the second solid material phase region 204) may be filled with beams and unfused manufacturing powder. In some examples, the first solid material phase region 202, the second solid material phase region 204, the plurality of beams, and the unfused manufacturing powder may be made from the same material (e.g., polymer), where the first solid material phase region 202 and the second solid material phase region 204 are solid, the weak material phase region 206 includes solid portions and a gap(s) (e.g., pores), and the unfused material is in a powder form.

In some examples, the weak material phase region 206 may be homogenized into a solid material with a different material property than the first solid material phase region 202 and the second solid material phase region 204. For instance, the weak material phase region 206 may have a lower strength, lower stress tolerance, and/or lower strain tolerance, etc., than the first solid material phase region 202 and the second solid material phase region 204. In some examples, structure, type, scale, and/or beam thickness may be utilized to control the homogenized material property(ies).

In some examples, a solid material phase region (e.g., first solid material phase region 202 and/or second solid material phase region 204) may have a depth that is smaller than the length and width with the beams being along an edge (e.g., an edge with a normal vector not aligned with the direction of the depth). In some examples, the length of the beams (and/or the width of the weak material phase region 206) may be smaller than a size of the first solid material phase region 202 and/or a size of the second solid material phase region 204. In some examples, the length of the beams (and/or the width of the weak material phase region 206) may be smaller than 5 mm.

In some examples, an outer surface of the first solid material phase region 202, the second solid material phase region 204, and/or the distanced beams may be an external surface of a 3D object or may be a portion of an external surface of a 3D object. In some examples, the first solid material phase region 202, the second solid material phase region 204, and/or the distanced beams may be exposed to external fluid and/or air. In some examples, the first solid material phase region 202, the second solid material phase region 204, and/or an outer edge of the weak material phase region 206 may be disposed on an outer surface of a fracturable object. In some examples, a solid cover may be disposed on (and/or over) the outer surface of the fracturable object to conceal the outer edge of the weak material phase region 206. For instance, a helmet may include a fracturable object that is concealed from view with a solid cover.

In some examples, an outer surface of a first solid material phase region, a second solid material phase region, and/or a lattice structure may be an external surface of a 3D object or may be a portion of an external surface of a 3D object. In some examples, a first solid material phase region, a second solid material phase region, and/or a lattice structure may be exposed to external fluid and/or air. In some examples, an outer edge of a lattice structure may be disposed on an outer surface of a fracturable object.

Figure 3:
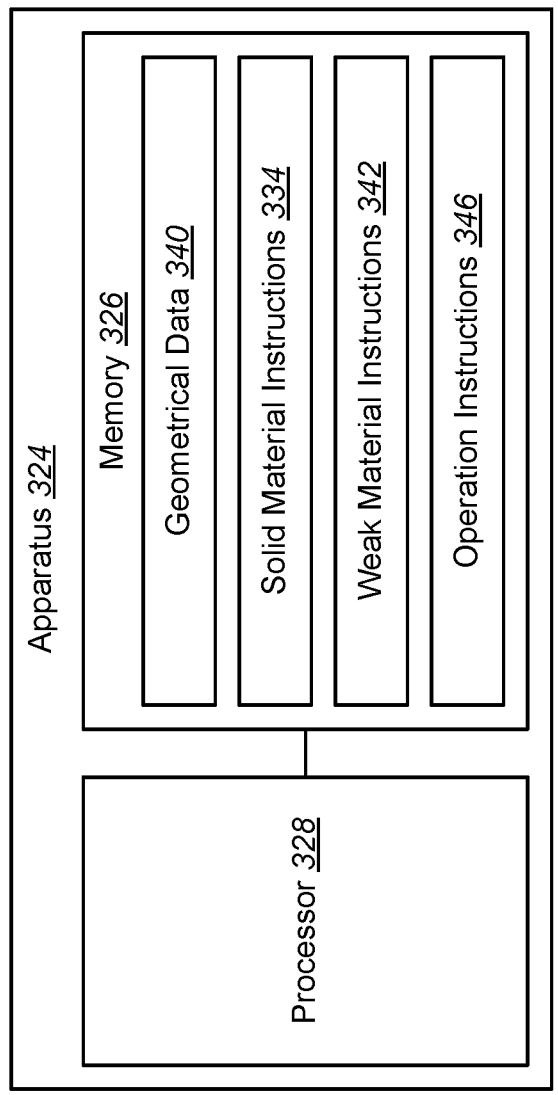
FIG. 3 is a block diagram of an example of an apparatus that may be used in manufacturing weak material phases.

FIG. 3 is a block diagram of an example of an apparatus 324 that may be used in manufacturing weak material phases. The apparatus 324 may be a computing device, such as a personal computer, a server computer, a printer, a 3D printer, a smartphone, a tablet computer, etc. The apparatus 324 may include and/or may be coupled to a processor 328, and/or a memory 326. In some examples, the apparatus 324 may be in communication with (e.g., coupled to, have a communication link with) an additive manufacturing device (e.g., a 3D printer). In some examples, the apparatus 324 may be an example of 3D printer. The apparatus 324 may include additional components (not shown) and/or some of the components described herein may be removed and/or modified without departing from the scope of the disclosure.

The processor 328 may be any of a central processing unit (CPU), a semiconductor-based microprocessor, graphics processing unit (GPU), field-programmable gate array (FPGA), an application-specific integrated circuit (ASIC), a combination thereof, and/or other hardware device suitable for retrieval and execution of instructions stored in the memory 326. The processor 328 may fetch, decode, and/or execute instructions stored on the memory 326. In some examples, the processor 328 may include an electronic circuit or circuits that include electronic components for performing a functionality or functionalities of the instructions. In some examples, the processor 328 may perform one, some, or all of the aspects, elements, techniques, etc., described in relation to one, some, or all of FIGS. 1 and 3-4. In some examples, the apparatus 324 may be utilized to manufacture one, some, or all of the objects, material phase regions, etc., described in relation to one, some, or all of FIGS. 1-10.

The memory 326 is an electronic, magnetic, optical, and/or other physical storage device that contains or stores electronic information (e.g., instructions and/or data). The memory 326 may be, for example, Random Access Memory (RAM), Electrically Erasable Programmable Read-Only Memory (EEPROM), a storage device, an optical disc, and/or the like. In some examples, the memory 326 may be volatile and/or non-volatile memory, such as Dynamic Random Access Memory (DRAM), EEPROM, magnetoresistive random-access memory (MRAM), phase change RAM (PCRAM), memristor, flash memory, and/or the like. In some examples, the memory 326 may be a non-transitory tangible machine-readable storage medium, where the term "non-transitory" does not encompass transitory propagating signals. In some examples, the memory 326 may include multiple devices (e.g., a RAM card and a solid-state drive (SSD)).

In some examples, the apparatus 324 may further include a communication interface (not shown in FIG. 3) through which the processor 328 may communicate with an external device or devices (not shown), for instance, to receive and store the information pertaining to a build or builds (e.g., data for object printing). The communication interface may include hardware and/or machine-readable instructions to enable the processor 328 to communicate with the external device or devices. The communication interface may enable a wired or wireless connection to the external device or devices. In some examples, the communication interface may further include a network interface card and/or may also include hardware and/or machine-readable instructions to enable the processor 328 to communicate with various input and/or output devices, such as a keyboard, a mouse, a display, another apparatus, electronic device, computing device, printer, etc. In some examples, a user may input instructions into the apparatus 324 via an input device.

In some examples, the memory 326 may store geometrical data 340. The geometrical data 340 may include and/or indicate a model or models (e.g., 3D object model(s)). The apparatus 324 may generate the geometrical data 340 and/or may receive the geometrical data 340 from another device.

The memory 326 may store solid material instructions 334. In some examples, the processor 328 may execute the solid material instructions 334 to print a first solid material phase region and a second solid material phase region distanced from the first material phase region. In some examples, the first solid material phase region and the second solid material phase region may be printed and/or manufactured as described in relation to FIG. 1 and/or FIG. 2. For instance, the processor 328 may control a printhead(s), printhead carrier(s), and/or fusing device(s) (e.g., laser(s), lamp(s), etc.) to form the first solid material phase region and the second solid material phase region.

In some examples, the memory 326 may store weak material instructions 342. The processor 328 may execute the weak material instructions 342 to determine and/or print a weak material phase region. In some examples, the geometrical data 340 may indicate a weak material phase region with a plurality of beams. In some examples, the geometrical data 340 may indicate a weak material phase region without indicating a specific structure(s). The processor 328 may execute the weak material instructions 342 to populate the weak material phase region with a plurality of beams. For instance, the processor 328 may determine locations and/or spacings for the plurality of beams. In some examples, the apparatus 324 may receive a parameter(s) for generating the weak material phase region. For instance, the apparatus 324 may receive a beam thickness parameter, a beam spacing parameter, and/or a beam pattern parameter, etc., via an input device (e.g., keyboard, touchscreen, microphone, etc.). The processor 328 may populate the weak material phase region with the plurality of beams in accordance with the received parameter(s).

In some examples, the apparatus 324 may receive a material property parameter (via an input device) and/or the geometrical data 340 may indicate a material property parameter (e.g., mechanical strength parameter, stress tolerance parameter, strain tolerance parameter, or a combination thereof, etc.). The processor 328 may execute the weak material instructions 342 to determine a beam thickness parameter, a beam spacing parameter, a gap size parameter, and/or a beam pattern parameter to achieve the material property parameter. For instance, greater mechanical strength may be achieved with decreased spacing, decreased gap size, and/or increased beam thickness. In some examples, beam thickness, beam spacing, and/or beam pattern may be determined from a lookup table that maps the material property parameter to a beam thickness, beam spacing, gap size, and/or beam pattern. In some examples, the beam thickness parameter, beam spacing parameter, beam pattern, and/or gap size parameter may be selected and/or constrained based on an input, where non-constrained values may be calculated by the processor 328. The processor 328 may populate a weak material phase region with a plurality of beams in accordance with the determined beam thickness, beam spacing, and/or beam pattern. The determined beams for the weak material phase region may be stored in the geometrical data 340 in some examples.

In some examples, the apparatus 324 may print and/or manufacture a weak material phase region as described in relation to FIG. 1 and/or FIG. 2. For instance, the processor 328 may control a roller(s), printhead(s), printhead carrier(s), and/or fusing device(s) (e.g., laser(s), lamp(s), etc.) to form the weak material phase region. For example, the 3D printing instructions may use a contone map or contone maps (stored as contone map data, for instance) indicating the weak material phase region to control a print head or heads to print an agent or agents in a location or locations specified by the plurality of beams. In some examples, the processor 328 may execute the 3D printing instructions to print a layer or layers. In some examples, the apparatus 324 may send printing instructions to a 3D printer to print the weak material phase region.

In some examples, the memory 326 may store operation instructions 346. In some examples, the processor 328 may execute the operation instructions 346 to perform an operation based on the weak material phase region. In some examples, the processor 328 may execute the operation instructions 346 to utilize the weak material phase region (e.g., plurality of beams) to serve another device (e.g., printer controller). For instance, the processor 328 may print (e.g., control amount and/or location of agent(s) for) a layer or layers based on the weak material phase region (e.g., plurality of beams). In some examples, the processor 328 may execute the operation instructions 346 to present a visualization or visualizations of the weak material phase region on a display and/or send data indicating the weak material phase region to another device (e.g., computing device, monitor, etc.).

Figure 4:
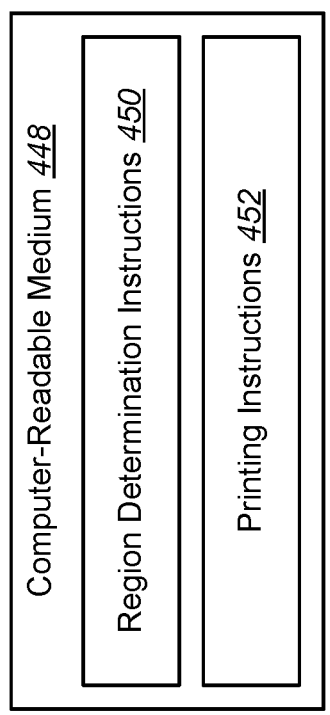
FIG. 4 is a block diagram illustrating an example of a computer-readable medium for printing a weak material phase.

FIG. 4 is a block diagram illustrating an example of a computer-readable medium 448 for printing a weak material phase. The computer-readable medium 448 is a non-transitory, tangible computer-readable medium. The computer-readable medium 448 may be, for example, RAM, EEPROM, a storage device, an optical disc, and the like. In some examples, the computer-readable medium 448 may be volatile and/or non-volatile memory, such as DRAM, EEPROM, MRAM, PCRAM, memristor, flash memory, and the like. In some examples, the memory 326 described in relation to FIG. 3 may be an example of the computer-readable medium 448 described in relation to FIG. 4. In some examples, the computer-readable medium 448 may include code, instructions, and/or data to cause a processor to perform one, some, or all of the operations, aspects, elements, etc., described in relation to one, some, or all of FIG. 1 and/or FIG. 3.

The computer-readable medium 448 may include data (e.g., information and/or instructions). For example, the computer-readable medium 448 may include region determination instructions 450 and/or printing instructions 452.

The region determination instructions 450 may be instructions when executed cause a processor of an electronic device to determine a weak material phase region between a first solid material phase region and a second solid material phase region. In some examples, the weak material phase region may include a plurality of beams, each having a thickness that is not more than one millimeter. In some examples the weak material phase region has be volumetric density less than one. In some examples, determining the weak material phase region may be performed as described in relation to FIG. 3.

The printing instructions 452 may be instructions when executed cause a processor of an electronic device to cause a 3D printer to print the first solid material phase region, the second solid material phase region, and the weak material phase region. In some examples, causing a 3D printer to print the first solid material phase region, the second solid material phase region, and the weak material phase region may be performed as described in relation to FIG. 1, FIG. 2, and/or FIG. 3.

In some examples, the weak material phase region may be disposed in a first gap pattern of a first level. In some examples, the processor may execute the printing instructions 452 to cause the 3D printer to print a second weak material phase region in a second gap pattern of a second level. In some examples, the weak material phase region includes a lattice structure that is mechanically weaker than the first solid material phase region and the second solid material phase region.

FIG. 5 is a diagram illustrating an example of an object 556 in accordance with some of the techniques described herein. The object 556 includes a first solid material phase region 570, a second solid material phase region 572, and a weak material phase region 574. In this example, the weak material phase region 574 includes a lattice structure. In some examples, the weak material phase region 574 may include spaces between spars of the lattice structure. In some examples, the spaces may be filled with unfused material.

FIG. 6 is a diagram illustrating an example of an object 658 in accordance with some of the techniques described herein. The object 658 includes a first solid material phase region 676, a second solid material phase region 678, and a weak material phase region 680. In this example, the weak material phase region 680 includes a lattice structure. In some examples, the weak material phase region 680 may include spaces between the spars. In some examples, the spaces may be filled with unfused material.

FIG. 7 is a diagram illustrating an example of an object 760 in accordance with some of the techniques described herein. The object 760 includes a first solid material phase region 782, a second solid material phase region 784, and a homogenized weak material phase region 786. In this example, when features (e.g., beams) are fine (e.g., with thickness of 1 mm or less) and the quantity is relatively large, the features may form the homogenized weak material phase region 786 with different material properties from those of the first solid material phase region 782 and the second solid material phase region 784.

Figure 8:
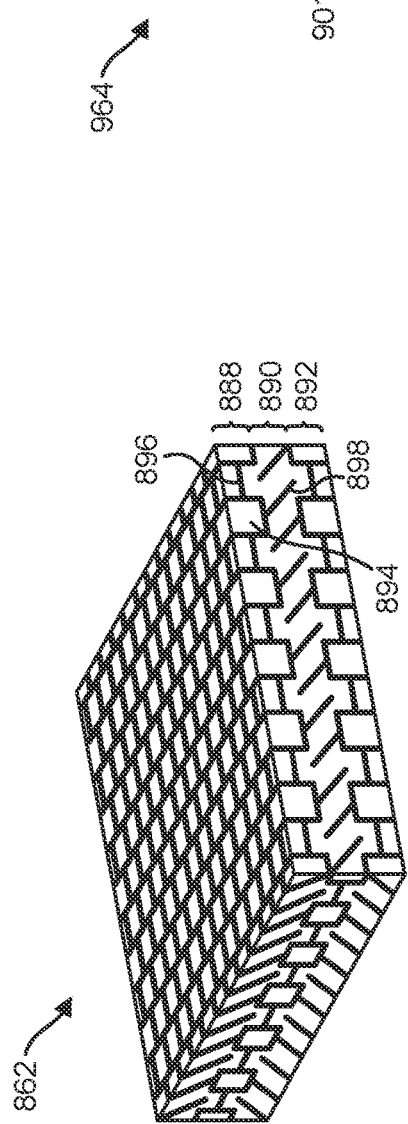
FIG. 8 is a diagram illustrating an example of an object in accordance with some of the techniques described herein.

FIG. 8 is a diagram illustrating an example of an object 862 in accordance with some of the techniques described herein. In some examples of the techniques described herein, weak material phases formed by fine solid features may be utilized to enhance impact resistance. In this example, the object 862 is embedded with weak material phase regions. When the object 862 is impacted and a crack starts, the crack tends to propagate along the weak material phase region(s). For instance, the lower fracture tolerance of the weak material phase regions may take less energy to fracture. Thus, a pattern or patterns of weak material phase regions may guide the crack into detour paths and/or dead ends. In some examples, detoured paths may take more energy for the crack to break the object 862. In some examples, when a crack meets a dead end, the crack may be forced to propagate back to a solid material phase region, which may take as much as energy as starting a new crack. Accordingly, it may take more energy to break the object 862 than an object with a completely homogeneous phase in some examples. Thus, the impact resistance of the object 862 may be enhanced.

In the example of FIG. 8, the object 862 includes three levels: a first level 888, a second level 890, and a third level 892. The object 862 may be an example of a leveled superstructure that includes a solid material phase region 894 and a weak material phase region 896. As illustrated in FIG. 8, the first level 888 may include a first pattern of a weak material phase region 896. The second level 890 may include a second pattern of a second weak material phase region 898 that is different from the first pattern. In some examples, different patterns may be rotations of a pattern. For instance, the second pattern of the second level 890 may be a 90-degree rotation in yaw relative to the first pattern of the first level 888. In some examples of the techniques described herein, a sequence of levels may include progressive rotations of a pattern to produce different patterns on the different levels.

Figure 9:
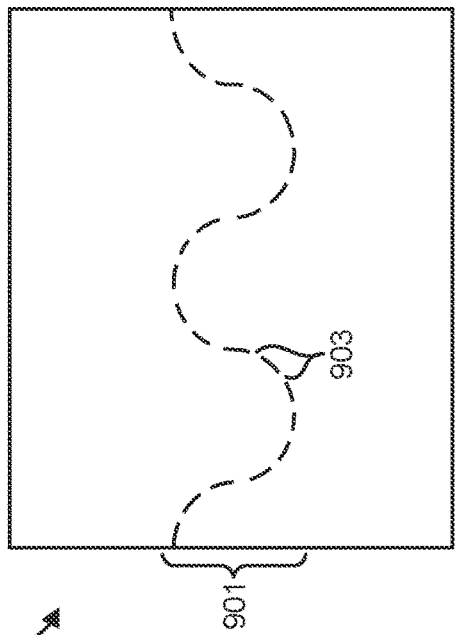
FIG. 9 is a diagram illustrating an example of an object in accordance with some of the techniques described herein.

FIG. 9 is a diagram illustrating an example of an object 964 in accordance with some of the techniques described herein. In some examples, a weak material phase region is patterned in a rounded shape. For instance, the weak material phase region may follow a rounded fracture pattern 901 to avoid sharp corners in a case where the object 964 is broken in pieces. In this example, the weak material phase region may include beams in a gap that follows a wave pattern. In some examples, a rounded fracture pattern may be embedded in a helmet. If the helmet is broken while protecting a human head, fewer or no sharp corners may result, which may reduce potential injury. For instance, fine solid features 903 (e.g., beams) may be utilized to form the weak material phase region to guide a crack that conforms to a smooth fracture pattern 901 between solid material phase regions.

Figure 10:
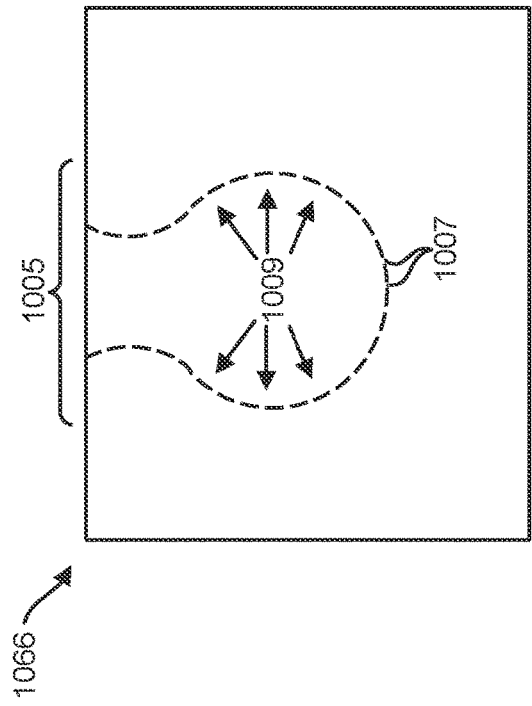
FIG. 10 is a diagram illustrating an example of an object in accordance with some of the techniques described herein.

FIG. 10 is a diagram illustrating an example of an object 1066 in accordance with some of the techniques described herein. In some examples, a fracture pattern 1005 of a weak material phase region is patterned in a retaining shape 1009. For instance, the object 1066 includes a gap with fine features 1007 (e.g., beams) that follow a retaining shape 1009 (e.g., interior bulge, mechanically interfering shape, etc.). The fracture pattern 1005 may be shaped such that the object 1066 will not fall apart, even when a fracture occurs along the fracture pattern 1005 between solid material phase regions.

In some examples of the techniques described herein, solid materials may be utilized, which may provide increased robustness. In some examples, homogenized material properties may be tunable. In some examples of the techniques described herein, multiple material properties may be achieved without using a second powder material and/or agent. Some of the techniques described herein may be relatively low-cost.

As used herein, the term "and/or" may mean an item or items. For example, the phrase "A, B, and/or C" may mean any of: A (without B and C), B (without A and C), C (without A and B), A and B (without C), B and C (without A), A and C (without B), or all of A, B, and C.

While various examples are described herein, the disclosure is not limited to the examples. Variations of the examples described herein may be within the scope of the disclosure. For example, aspects or elements of the examples described herein may be omitted or combined.

What is claimed is:

1. A method, comprising:
   printing a first solid material region;
   printing a second solid material region distanced from the first solid material region; and
   printing a weak material region that separates the first solid material region from the second solid material region, the weak material region comprised of a plurality of beams, each of the plurality of beams having a thickness that is not more than one millimeter and each of the plurality of beams being horizontally separated from each other by a distance of at least 0.5 millimeters to form a plurality of gaps within the weak material region, wherein the weak material region has a volumetric density that is less than one based on the distance separating each of the plurality of beams from each other, and wherein the weak material region and the first solid material region are printed using a same base powder and a same manufacturing procedure.

2. The method of claim 1, wherein at least one beam of the plurality of beams connects the first solid material region to the second solid material region.

3. The method of claim 1, wherein at least one of the gaps in the plurality of beams is filled with an unfused substance.

4. The method of claim 3, wherein the unfused substance is unfused base powder.

5. The method of claim 1, wherein the weak material region is disposed in a first pattern in a first level of a leveled superstructure that includes the first solid material region and the second solid material region, and wherein a second weak material region is disposed in a second pattern in a second level of the leveled superstructure, wherein the second pattern is different from the first pattern.

6. The method of claim 1, wherein the weak material region is directed to a dead end.

7. The method of claim 1, wherein the weak material region is patterned in a rounded shape.

8. The method of claim 1, wherein the weak material region is patterned in a retaining shape.

9. The method of claim 1, wherein the weak material region comprises a lattice structure.

10. The method of claim 1, wherein a distance between the first solid material region and the second solid material region is less than one inch.

* * * * *